(12) United States Patent
Gibson et al.

(10) Patent No.: US 11,109,582 B2
(45) Date of Patent: Sep. 7, 2021

(54) INSECT TRAP

(71) Applicant: The University of Greenwich, London (GB)

(72) Inventors: Gabriella Gibson, London (GB); Frances Hawkes, London (GB)

(73) Assignee: The University of Greenwich, London (GB)

( * ) Notice: Subject to any disclaimer, the term of this patent is extended or adjusted under 35 U.S.C. 154(b) by 370 days.

(21) Appl. No.: 15/746,557

(22) PCT Filed: Jul. 21, 2016

(86) PCT No.: PCT/GB2016/052207
§ 371 (c)(1),
(2) Date: Jan. 22, 2018

(87) PCT Pub. No.: WO2017/013432
PCT Pub. Date: Jan. 26, 2017

(65) Prior Publication Data
US 2018/0206471 A1 Jul. 26, 2018

(30) Foreign Application Priority Data
Jul. 22, 2015 (GB) .................................. 1512924

(51) Int. Cl.
*A01M 1/02* (2006.01)
*A01M 1/14* (2006.01)
(Continued)

(52) U.S. Cl.
CPC .............. *A01M 1/023* (2013.01); *A01M 1/00* (2013.01); *A01M 1/14* (2013.01); *A01M 1/2016* (2013.01); *E04H 15/14* (2013.01)

(58) Field of Classification Search
CPC .......... A01M 1/00; A01M 1/023; A01M 1/14; A01M 1/2016; E04H 15/14
(Continued)

(56) References Cited

U.S. PATENT DOCUMENTS 5,048,224 A * 9/1991 Frisch .................... A01M 1/02
43/107
6,305,122 B1 10/2001 Iwao
(Continued)

FOREIGN PATENT DOCUMENTS

| EP | 1219171 | 7/2002 |
|---|---|---|
| GB | 2262699 | 6/1993 |
| WO | 99044417 | 9/1999 |

OTHER PUBLICATIONS

International Search Report for GB1512924.0 dated Jan. 19, 2016.
International Search Report and Written Opinion for PCT/GB2016/052207, dated Sep. 19, 2016.

*Primary Examiner* — Claude J Brown
(74) *Attorney, Agent, or Firm* — Pabst Patent Group LLP (57) ABSTRACT

An insect trap (100) and method for trapping and/or killing insects are disclosed. The insect trap comprises an enclosure (10) for receiving a human or an animal, and comprising an opening (12) configured to allow air to flow out of the enclosure and prevent insects from entering the enclosure, and a trapping unit (30) outside of the enclosure and in fluidic communication with the opening. The trapping unit comprises a heatable container (32) comprising either an adhesive material (31) for attracting and trapping an insect or a material comprising insecticide for killing an insect.

19 Claims, 5 Drawing Sheets

(51) Int. Cl.
*A01M 1/00* (2006.01)
*A01M 1/20* (2006.01)
*E04H 15/14* (2006.01)

(58) Field of Classification Search
USPC .......................................................... 43/107
See application file for complete search history.

(56) References Cited

U.S. PATENT DOCUMENTS

| | | |
|---|---|---|
| 2002/0129539 A1 | 9/2002 | Brunet |
| 2003/0070345 A1 | 4/2003 | Nolen |
| 2005/0055870 A1* | 3/2005 | Yelverton ............... A01M 1/04 43/113 |
| 2008/0060256 A1 | 3/2008 | Chu |
| 2010/0212211 A1* | 8/2010 | Scheubeck ............ A01M 1/023 43/107 |
| 2011/0138678 A1* | 6/2011 | Smith ................... A01M 1/023 43/107 |
| 2015/0007485 A1* | 1/2015 | Hortel ................... A01M 1/023 43/114 |
| 2015/0173338 A1 | 6/2015 | McCammon |
| 2017/0238522 A1* | 8/2017 | Wakarchuk ........... A01M 1/106 |
| 2018/0027795 A1* | 2/2018 | Janet ..................... A01M 1/026 |

* cited by examiner

INSECT TRAP

CROSS-REFERENCE TO RELATED APPLICATIONS

This application is a 371 application of International Application No. PCT/GB2016/052207, filed Jul. 21, 2016, which claims benefit of and priority to GB application no. 1512924.0, filed Jul. 22, 2015, the disclosures of which are incorporated herein by reference in their entirety.

FIELD

The present invention relates to insect traps. More specifically, the present invention relates to insect traps for attracting, trapping, and/or killing mosquitoes, and to corresponding methods.

BACKGROUND

Mosquitoes of the *Anopheles gambiae* species complex are the most efficient vectors of malaria on the planet and are responsible for most deaths from this disease in sub-Saharan Africa. The existing prevalent standard method for monitoring mosquito populations in disease-endemic situations is referred to as the Human Landing Catch (HLC). This method involves a human volunteer who collects individual mosquitoes as they land on their exposed leg(s). This method is used because it directly represents the number of mosquitoes attracted to a person, and the collected mosquitoes can be analysed for a range of metrics that establish the status of the population with regard to risk of pathogen transmission, e.g., number of biting mosquitoes per night of vector species, proportion of target species infected with pathogens and other characteristics that are essential to monitoring levels of mosquito-borne disease, such as changes in mosquito population density and the outcome of disease control activities. However, the method is labour-intensive and thus expensive, and it requires intensive supervision to maintain quality and standardisation of data obtained. Most problematic of all is that it exposes the collector to infection with mosquito-borne pathogens, for many of which there is no vaccine or treatment available. This method is no longer seen as ethically acceptable by major donors and international public health organisations. Consequently, there is a need to replace this method with a cheap, reliable and exposure-free alternative.

Various alternative trapping methods have been published in the last fifteen years, but these do not perform as well as the Human Landing Catch. They do not catch as many mosquitoes, they catch a different range of species of mosquitoes, and/or there is a poor correlation between these trap catches and Human Landing Catches with regard to the salient characteristics of the catch (described above), and, therefore, are of very limited use in monitoring disease transmission. Most of these traps catch between 1% and 40% of the malaria mosquitoes caught by a Human Landing Catch, which is too few to provide reliable data.

The most important species of malarial mosquitoes bite late at night, when people are asleep. They follow plumes of human odour to locate their next bloodmeal. Most existing monitoring traps are designed to exploit that behaviour, using human odour to bring mosquitoes within close vicinity of the trap. Once mosquitoes are lured to such a trap, they are either sucked up by a fan and deposited into a collection container, or they fly into an entry-no-return "lobster-pot" style trap.

Furthermore, currently the majority of mosquito control programmes kill significant proportions of adult mosquitoes in sub-Saharan Africa by spraying inside houses/huts (indoor residual spraying, IRS), or using insecticide-treated bednets (ITN). These methods only work for mosquitoes that enter houses/huts. Increasingly, malaria (and many other mosquito-borne diseases) is spread by mosquitoes that never enter dwellings, instead biting people outdoors.

Aspects of the present invention aim to address one or more drawbacks inherent in prior art methods and apparatus for trapping insects and/or killing insects, particularly mosquitoes.

SUMMARY

According to a first aspect of the present invention, there is provided an insect trap comprising:
  an enclosure for receiving a human or an animal therein, and comprising an opening configured to allow air to flow out of the enclosure and prevent insects from entering the enclosure; and
  a trapping unit disposed outside of the enclosure and in fluidic communication with the opening, and comprising a heatable container comprising either: (i) adhesive material for trapping an insect, or (ii) material comprising insecticide for killing an insect.

Advantageously, the trap of the invention is used to allow insects, particularly mosquitoes, to be trapped and monitored in large numbers without any harm coming to humans or animals. Additionally, this allows an insect population, particularly that of mosquitoes, to be controlled en masse using outdoor equipment.

The insect trap may be used to trap a variety of insects, such as flies and beetles. Preferably, the adhesive material is for trapping a landing insect or the insecticide is for killing a landing insect.

Preferably, however, the trap is a mosquito trap. The mosquito may be of the *Aedes*, *Anopheles* or *Culex* genera. Most preferably, the mosquito is *Anopheles*, more preferably *A. gambiae* or *A. funestus*. Preferably, the trap is a malaria vector trap.

The opening may be polygonal in shape. Preferably, however, the opening is circular. The opening preferably comprises mesh extending thereacross and configured to allow ventilation in and out of the enclosure for the comfort of the human or animal, but prevent insects from entering the enclosure.

The insect trap may be arranged to allow body odour from the human or animal to be directed towards the heatable container.

The heatable container may comprise a liquid for retaining heat energy. The liquid may be water.

Preferably, the trapping unit is insulated at least at the top and the bottom to maintain a relatively constant external surface temperature when heated liquid is placed in the heatable container to heat the heatable container.

The trapping unit may further comprise:
  a heating element for heating the heatable container; and
  a power supply for driving the heating element.

The heating element may be disposed inside the container. Alternatively, the heating element may be disposed outside of the container. The heating element may generate heat by electrical resistance. Alternatively, the heating element may be a thermal lamp.

The heating element may also be a microwave generator for heating the liquid in the heatable container. The heating element may be a fire driven by combustible fuel.

The liquid may comprise chemicals that produce an exothermic reaction when mixed to heat the heatable container, which alleviates the need for a separate heating element.

For example, the liquid may comprise ammonia and a suitable acid, such as hydrochloric acid.

The power supply may be a battery. Alternatively, the power supply may be an AC generator. Alternatively, the power supply may be a fuel supply for combustible fuel. Preferably, the trapping unit comprises a digital timer.

The trapping unit may comprise a controller for controlling the supply of power to the heating element. The controller is preferably configured to control the temperature of the container at a set-point, which approximately simulates human or animal body temperature. For example, the heatable container may be heatable to a temperature of between 35 degrees Celsius and 40 degrees Celsius, preferably between 36 and 39 degrees Celsius. Preferably, the liquid is heatable to a temperature of about 37 degrees Celsius, to simulate human body temperature. Therefore, the controller, programmed with the size, weight, and material of the heatable container, is configured to limit current supply, or turn the heating element off after a certain time, if it calculates that the heatable container's temperature will exceed this threshold. Preferably, the controller is a PI controller, more preferably a PID controller.

In another embodiment, the trapping unit preferably comprises a temperature sensor configured to sense the temperature of the liquid. In use, the temperature is preferably fed to the controller, which controls the heating element to heat the liquid to the typical body temperature of a human or animal. When the temperature sensor detects the temperature of the liquid exceeds a threshold, such as the human body temperature of 37 degrees Celsius, the heating element may be turned off until the temperature sensor detects the temperature of the liquid has fallen below another threshold, for example 35 degrees Celsius.

In other embodiments, the liquid is heated prior to using the insect trap. The heatable container is insulated, so that heat is steadily released from the surface of the trap over a long period of time. In some embodiments, the trapping unit is insulated at the top and the bottom.

The insect trap may further comprise a conduit having two open ends, the first end being coupled to the opening of the enclosure and the second end being disposed at least adjacent to the trapping unit. The diameter of the first end of the conduit may be the same diameter as that of the opening. Alternatively, the diameter of the first end of the conduit may be of greater diameter than that of the opening.

The length of the conduit may be at least 1 m, 2 m, 3 m, 4 m or 5 m. Preferably, the length of the conduit is at least 6 m, 7 m or 10 m. Preferably, the trapping unit is spaced apart from the enclosure at least by the length of the conduit. Preferably, the second end of the conduit is less than 1 m from the trapping unit, more preferably less than 50 cm from the trapping unit, and even more preferably less than 25 cm from the trapping unit.

The conduit preferably comprises a non-porous material. The conduit may comprise a flexible material, for example fabric. Alternatively, the conduit may comprise a resilient material. Preferably, the conduit is hollow. The conduit may be telescopic. The conduit may be a single unit having concertinaed sections. Alternatively, the conduit may comprise a plurality of short elements that fit inside one another, while remaining slidable with respect to one another.

The heatable container may be dark in colour. Preferably, the heatable container is of as high contrast against the environment as possible, which may be either a contrast in colour or pattern. Contrast of pattern might be a solid colour if surrounded by vegetation, such as grasses or shrubs.

The adhesive material or the material comprising insecticide may cover side surfaces of the heatable container, and is preferably of high contrast, as described above. The adhesive material or the material comprising insecticide may cover the top of the heatable container. In other embodiments, the adhesive material or the material comprising insecticide is transparent, while the heatable container is of high contrast as described above. In other words, the trapping unit may be of high contrast against the environment in colour or pattern.

The adhesive material may comprise or be impregnated with an insecticide. The adhesive material may be double-sided sticky tape. Advantageously, it may be simply peeled off the container with insects stuck thereto, and easily replaced.

The enclosure may comprise a fan for blowing air through the opening towards the outside. The fan may be integrated with the opening. Alternatively, the fan may be a standalone device.

The enclosure may be a tent. Alternatively, the enclosure may be an animal shelter. Alternatively again, the enclosure may comprise a surface upon which a person may lie, and comprising a mosquito net suspended thereover, wherein the opening is one of the apertures in the mosquito net.

Preferably, the insect trap further comprises a canopy suspended over the trapping unit.

Preferably, the insect trap is a mosquito trap.

According to a second aspect, there is provided use of the insect trap according to the first aspect, for attracting, trapping, and/or killing insects, which are preferably mosquitoes.

According to a third aspect, there is provided a method of trapping and/or killing an insect, the method comprising:
  disposing a human or animal inside an enclosure comprising an opening configured to allow air to flow out of the enclosure and prevent insects from entering the enclosure; and
  arranging a trapping unit outside of the enclosure to be in fluidic communication with the opening, wherein the trapping unit comprises a heatable container comprising either: (i) adhesive material for trapping an insect, or (ii) material comprising insecticide for killing an insect.

The method may allow body odour from the human or animal to be directed towards the heatable container.

The method may comprise disposing a liquid in the heatable container for retaining heat energy. The liquid may be water. The liquid may comprise chemicals, and the method may comprise mixing the chemicals to create an exothermic reaction to heat the heatable container. Alternatively, the method may comprise heating the heatable container using a heating element.

The method may further comprise wrapping the heatable container in insulating material at least at the top and the bottom such that the heatable container maintains an approximately constant surface temperature when a heated liquid is placed in the heatable container to heat the heatable container.

The method may comprise controlling the supply of power to the heating element. The method may comprise controlling the temperature of the container at a set-point, which approximately simulates human or animal body temperature.

The method may comprise heating the heatable container to simulate a body temperature of between 35 degrees Celsius and 40 degrees Celsius, preferably between 36 and 39 degrees Celsius. Preferably, the method comprises heating the heatable container to simulate a body temperature of about 37 degrees Celsius. Therefore, the method may comprise programming a controller with the size, weight, and material of the heatable container, limiting current supply, or turning the heating element off after a certain time, if the controller calculates that the heatable container's temperature will exceed this threshold.

In some embodiments, the method may comprise heating the liquid prior to using the insect trap.

The method may further comprise coupling a first end of a conduit to the opening of the enclosure and disposing a second end of the conduit at least adjacent to the trapping unit. Preferably, the second end of the conduit is less than 1 m from the trapping unit, more preferably less than 50 cm from the trapping unit, and even more preferably less than 25 cm from the trapping unit. The diameter of the first end of the conduit may be the same diameter as that of the opening. Alternatively, the diameter of the first end of the conduit may be of greater diameter than that of the opening.

The conduit preferably comprises a non-porous material. The conduit may comprise a flexible material, for example fabric. Alternatively, the conduit may comprise a resilient material. The conduit may be telescopic. Preferably, the conduit is hollow.

The conduit may be a single unit having concertinaed sections. Alternatively, the conduit may comprise a plurality of short elements that fit inside one another, while remaining slidable with respect to one another.

The heatable container may be dark in colour. Preferably, the heatable container is of as high contrast against the environment as possible, which may be either a contrast in colour or pattern. Contrast of pattern might be a solid colour if surrounded by vegetation, such as grasses or shrubs.

The method may comprise covering side surfaces of the heatable container with the adhesive material or the material comprising insecticide, and preferably wherein the adhesive material or the material comprising insecticide are of high contrast, as described above. The adhesive material or the material comprising insecticide may cover the top of the heatable container. In other embodiments, the adhesive material or the material comprising insecticide is transparent, while the heatable container is of high contrast as described above. In other words, the method may comprise arranging the trapping unit to be of high contrast against the environment in colour or pattern.

The method may comprise impregnating the adhesive material with an insecticide. The method may comprise peeling the adhesive material off the container.

The method may comprise blowing air through the opening to the outside using a fan.

All features described herein (including any accompanying claims, abstract and drawings), and/or all of the steps of any method or process so disclosed, may be combined with any of the above aspects in any combination, except combinations where at least some of such features and/or steps are mutually exclusive.

BRIEF DESCRIPTION OF THE FIGURES

Embodiments of the present invention will now be described, by way of example only, with reference to the accompanying drawings, in which.

In the drawings, like reference numerals refer to like features throughout.

DETAILED DESCRIPTION

Figure 1:
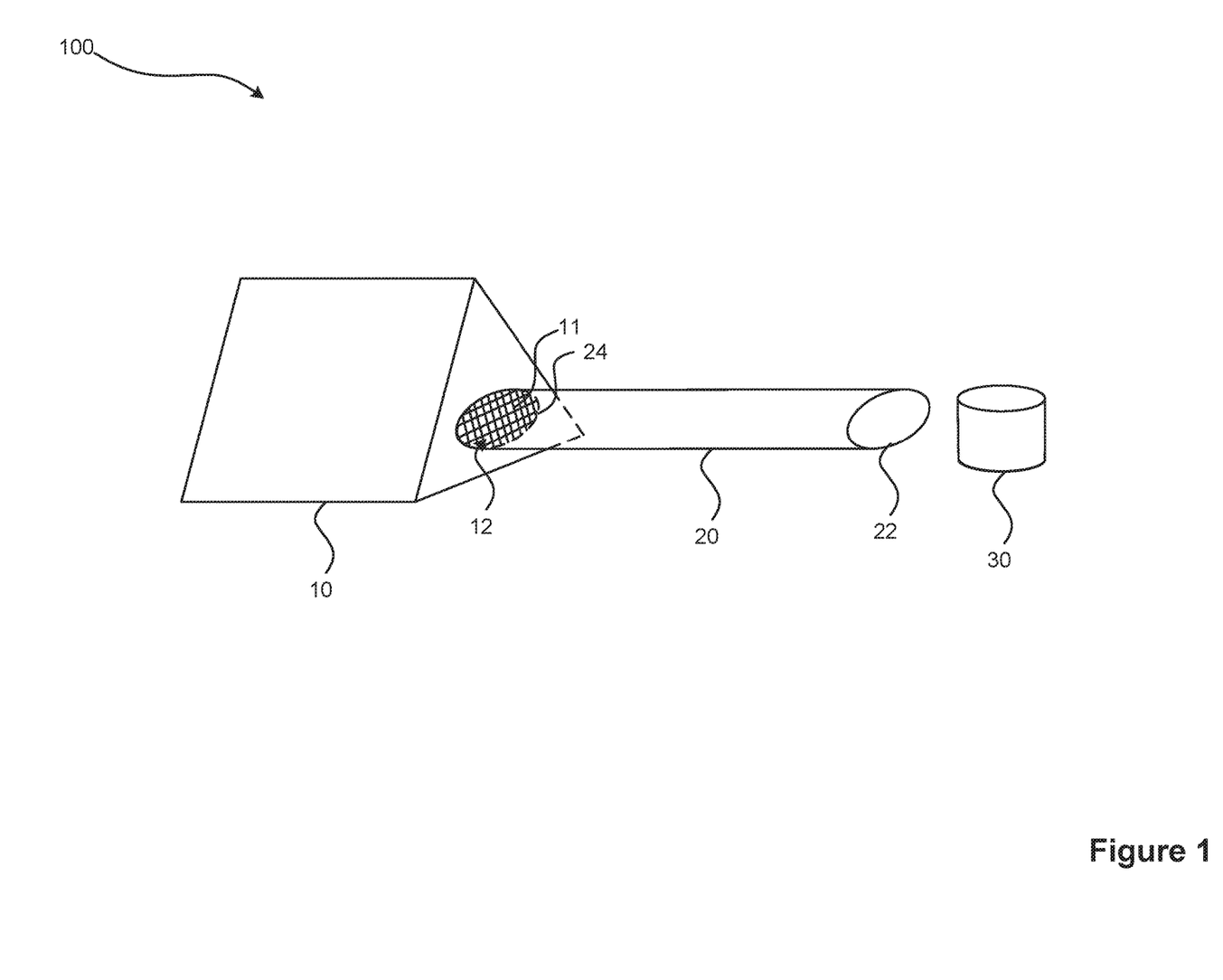
FIG. 1 shows a first embodiment of an insect trap according to the present invention.

With reference to FIG. 1, an insect trap 100 is shown that comprises an enclosure 10, a conduit 20 connected thereto, which leads to a trapping unit 30. The insect trap 100 can be used to trap a variety of insects, such as flies and beetles. However, in an exemplary embodiment, the insect trap 100 is for trapping mosquitoes.

The insect trap 100 exploits the natural behaviour of malaria mosquitoes searching for a human or animal to bite. The insect trap 100 incorporates the sensory stimuli that mosquitoes detect and respond to when searching for prey. These stimuli include: human or animal body odours to attract the mosquitoes; high visual contrast; and heat at human or animal body temperature. This combination of stimuli firstly attracts mosquitoes to the insect trap 100 and then stimulates mosquitoes to land on the surface of the trapping unit 30. In other words, the landing behaviour of the mosquitoes is exploited.

The insect trap 100 has been developed with a specific view to being used for trapping and/or killing malaria mosquitoes (*Anopheles* species) in malaria-endemic countries (specifically sub-Saharan Africa). However, preliminary data suggests that the insect trap 100 is also capable of catching other mosquito species that are responsible for transmitting a range of other diseases, including lymphatic filariasis (*Culex* species), dengue fever (*Aedes* species) and malarial *Anopheles* species throughout the tropics that bite mainly outdoors. This provides the insect trap 100 with a much broader application to a variety of geographical and public health contexts, including those found in Asia and South America.

In the embodiment shown in FIG. 1, the enclosure 10 is a tent in which a human can sleep. Alternatively, the enclosure is an animal shelter designed to house a mammal such as a cat, a mouse, or a larger animal such as a cow or sheep. The enclosure 10 may contain food and water in order to sustain the human or animal. Instead of a tent, the enclosure 10 may be a bed surrounded by a mosquito net.

The enclosure 10 is generally sealed to prevent ingress of rain water, wind and insects. An opening 12 is disposed on one side of the enclosure 10, and comprises a breathable material 11 extending thereacross that allows air to pass out of the enclosure 10, while preventing insects from entering the enclosure 10.

When a human or animal is present in the enclosure 10, the air comprises body odours and by-products such as carbon dioxide. The opening 12 is dimensioned to allow a high concentration of the body odours at an outside region of the enclosure 10, while being large enough to prevent suffocation of the human or animal.

The opening 12 is circular in order to maximise the surface area through which air can flow in relation to the perimeter of the opening 12. The enclosure 10 is designed to protect the human or animal from the elements, and so it is preferable to keep the size of the opening 12 to a minimum. The opening 12 may be an aperture in a mosquito net, when the mosquito net comprises the enclosure 10.

In another embodiment, a fan (not shown) is disposed inside the enclosure 10 in order to blow air out of the opening 12. The fan may be integrated with the opening 12, or may be a standalone device. This increases the intensity of the odour outside of the is opening 12.

The conduit 20 is attached to the opening 12. A first end 24 of the conduit 22 is the same diameter as the diameter of the opening 12. Alternatively, the first end 24 of the conduit has a greater diameter than the diameter of the opening 12. This ensures that air does not leak out of the conduit 20. A second end 22 of the conduit 20 is disposed at least adjacent to the trapping unit 30 such that odours flowing through the conduit are significantly detectable at the trapping unit 30. In other words, the second end 22 of the conduit 20 is placed in close proximity to the trapping unit 30. One end of the conduit 20 in an exemplary embodiment is positioned centimetres from the trapping unit 30. The trapping unit 30 is described in more detail later with reference to FIGS. 4 and 5.

In one embodiment, the conduit 20 is made of plastic. Alternatively, in another embodiment, the conduit 20 is made of non-porous fabric. The conduit 20 is hollow. In the embodiment in FIG. 1, the conduit 20 is rigid, or resilient, such as a drainage pipe, and can be arranged to extend along the ground. Alternatively, the conduit 20 may be supported by stanchions to raise it off the ground. The conduit 20 in an exemplary embodiment is 10 metres in length.

Where the enclosure 10 is a small animal shelter, the opening may be the whole or substantially a large area of one side of the enclosure 10. The conduit 20 is then dimensioned to fit the side of the enclosure 10.

In some embodiments, the insect trap 100 includes a canopy suspended over the trapping unit 30 so that electrical equipment within the trapping unit 30, and/or its sticky coating (described later), is not damaged by rain water. The canopy is, for example, a marquee.

Figure 2:
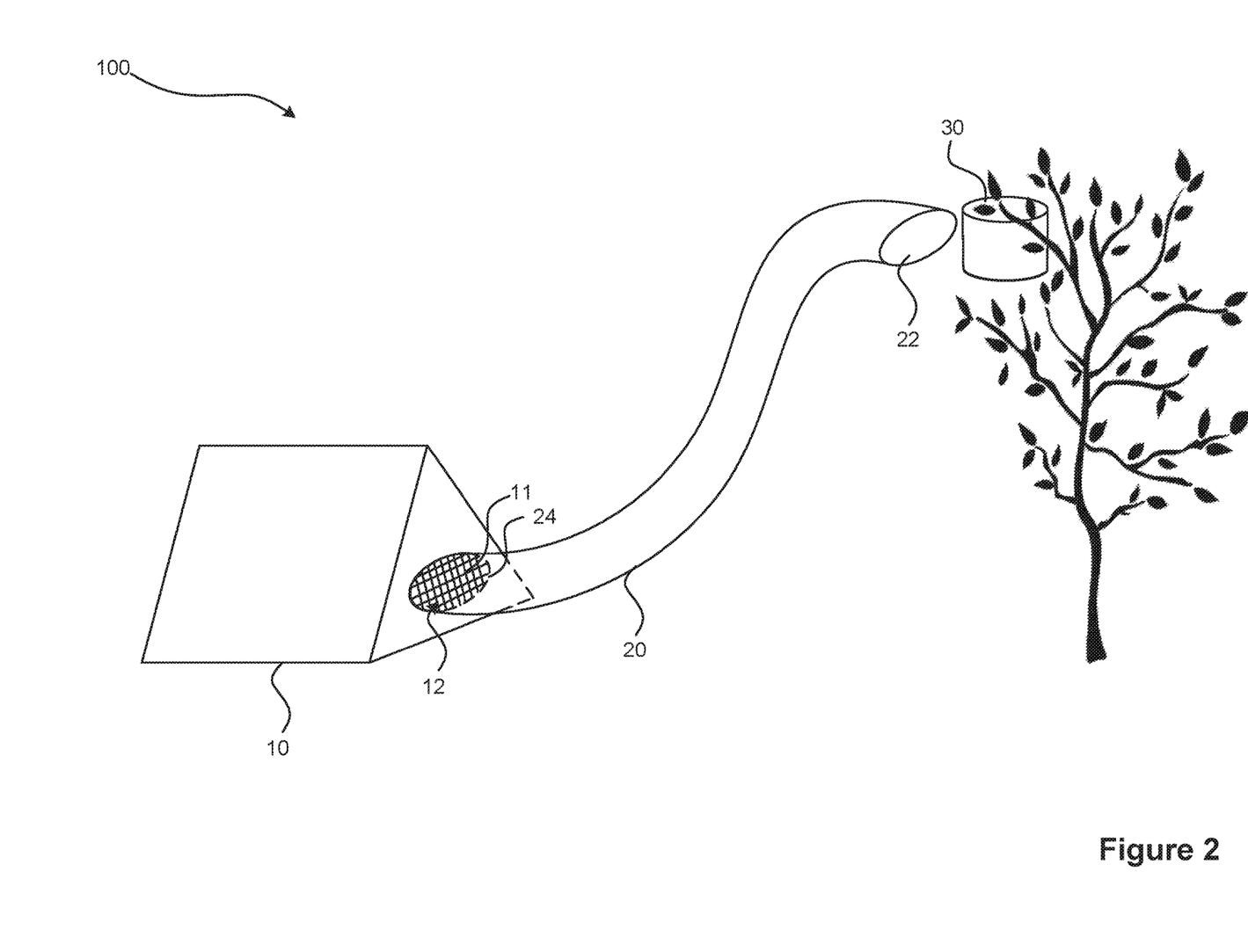
FIG. 2 shows the insect trap of FIG. 1 in an alternative configuration.

In the embodiment of FIG. 2, the conduit 20 is made of a flexible material. Advantageously, this allows the trapping unit 30 to be positioned in geographically challenging areas, such as up a tree or in a ravine. This area may be where mosquitoes are particularly prevalent, or may be used to draw the mosquitoes above or below the enclosure 10 to make it easier for the human or animal to leave the enclosure 10 without being bitten.

In another embodiment (not shown), the conduit 20 is telescopic. Advantageously, this allows the insect trap 100 to be easily stored and transported when not in use. Where the conduit 20 is rigid, it may comprise a plurality of short pipes, each subsequent pipe having an external diameter matching the internal diameter of the preceding pipe. In other words, the plurality of pipes are arranged to fit inside each other and form an airtight seal with each other. Alternatively, where the conduit 20 is flexible, the conduit 20 may comprise expandable ribs so as provide a concertina effect.

Figure 3:
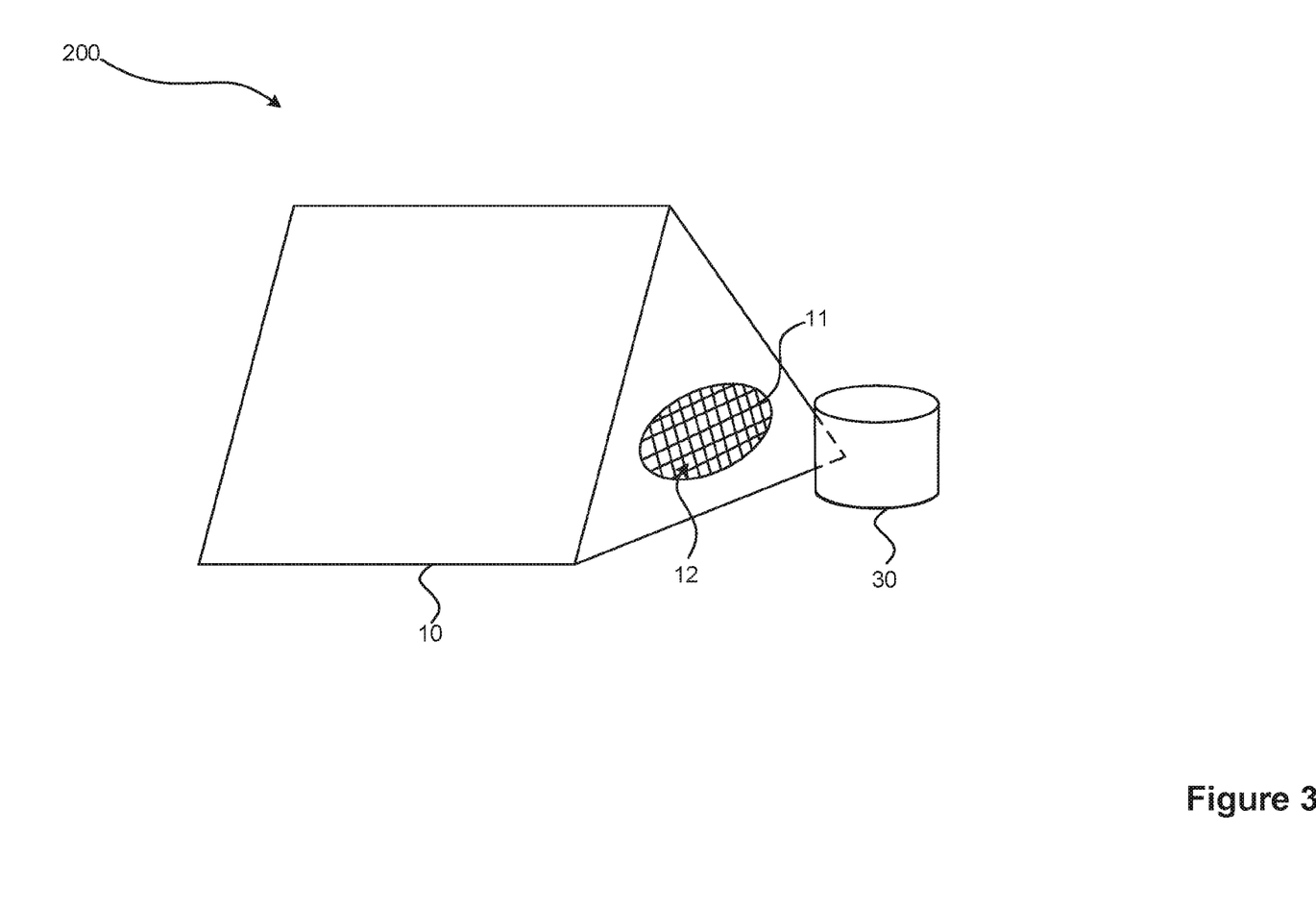
FIG. 3 shows a second embodiment of the insect trap according to the invention.

In alternative embodiments to those shown in FIG. 1 and FIG. 2, the insect trap 200 does not comprise a conduit. Instead, the trapping unit 30 is placed in close proximity to the opening 12, as shown in FIG. 3. This further reduces the complexity of the insect trap 200.

The trapping unit 30 will now be described with reference to FIG. 4. An alternative embodiment of the trapping unit 300 will be described with reference to FIG. 5. It would be readily understood that both of the trapping units 30, 300 are compatible with all of the embodiments described above. Like reference numerals are used to describe like parts.

Figure 4:
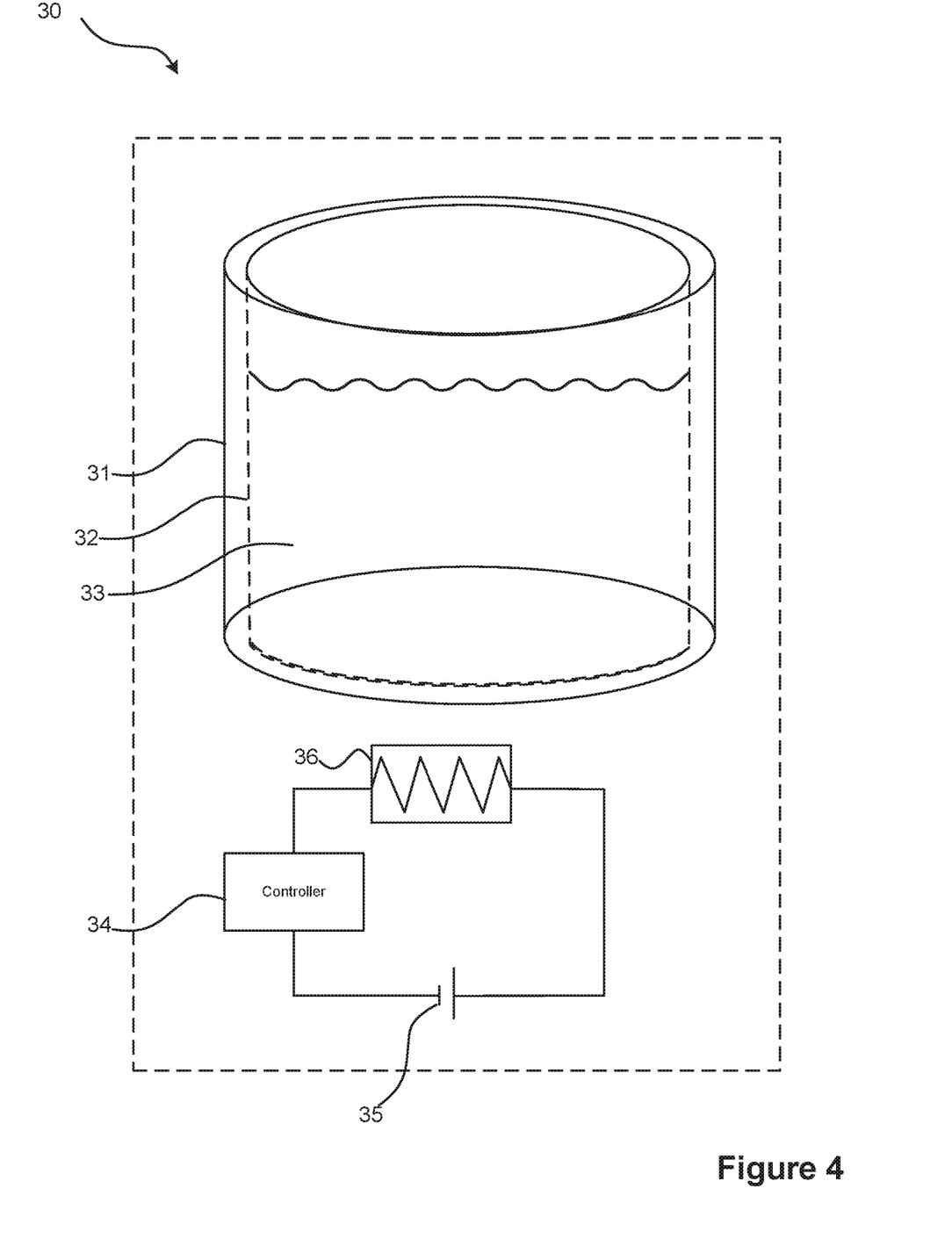
FIG. 4 shows one embodiment of a trapping unit of the insect trap according to the present invention.

The trapping unit 30 shown in FIG. 4 includes a heatable container 32, which is made of any suitable material that does not melt when heated to 40 degrees Celsius. In some embodiments, the heatable container 32 is insulated, so that its contents can cool slowly over time and provide a steady source of heat when the heated container 32 is not being actively heated. For example, the heatable container 32 is made of aluminium and coated in black fabric or plastic. In some embodiments, maximum insulation is provided at the top and the bottom of the heatable container 32. This minimises heat loss from areas that are not sticky. Heat loss on the sides of container 32 is controlled so sticky areas remain within the range of 30-40° C. (or at least a few degrees above ambient air temperature) for approximately 12 hours when the container 32 is not being heated. This is measured by a thermal gun in an exemplary embodiment. Insulation may be provided by a towel wrapped around the container 32. No air gaps are provided between the insulation and the container 32, as these would produce 'cold patches'. Insulation can be held in place with adhesive, Velcro, safety pins, or sewn together.

The heatable container 32 is of high contrast with its surroundings, either in pattern or colour. For example, to be of high contrast with green shrubs, the heatable container is dark in colour, i.e. it is black.

The heatable container 32 contains a liquid 33 for simulating the body of a human or animal. The liquid 33 retains heat energy, and ensures uniform heating across the heatable container 32. The liquid 33 may be, for example, water heated to between 70 and 80 degrees Celsius. The liquid 33 may be heated before being put in the heatable container 32 such that an active heat source and electronic components are not necessary.

Alternatively, in another embodiment, the liquid 33 may be a plurality of chemicals that, when mixed, produce an exothermic reaction. For example, the chemicals may be ammonia and hydrochloric acid. In this embodiment, external heating of the heatable container 32 is not necessary.

Although not as efficient, the heatable container 32 need not contain liquid 33 in order to be heated. The surface of the heatable container 32 is covered in an adhesive material 31. The mosquitoes attracted to the trapping unit 30 therefore become stuck to the adhesive material 31 when they attempt to land on the heatable container 32, so their population can be monitored. The adhesive material 31 is a plastic sheet or double-sided tape. The adhesive material is of high contrast, as insects, particularly mosquitoes, are attracted to colours with high contrast relative to the environment. Ideally, the adhesive material 31 is black, as environments are rarely black.

As shown in FIG. 4, the adhesive material 31 completely covers the heatable container 32. Alternatively, the adhesive material 31 may cover only the top surface of the heatable container 32, or only the side surfaces of the container 32.

The adhesive material 31 is chosen so as to be easily detachable from the heatable container 32. This allows the adhesive material 31 to be replaced at the end of an experiment, or when it is completely covered in insects.

As the insect trap 100 catches large numbers of mosquitoes, and can be used outdoors, it is possible to adapt the insect trap 10 for mosquito population control. Consequently, in some embodiments, the adhesive material is impregnated with insecticide. Alternatively, in order to allow a greater number of mosquitoes to come into contact with the insecticide, the adhesive material 31 is replaced with material comprising insecticide. The material may be fabric, such as cotton, treated with insecticide. The insect trap 100 would also intercept and kill indoor-biting mosquitoes before they entered dwellings, thereby providing an extra level of protection for people indoors and decreasing reliance on only indoor-based control measures.

The trapping unit 32 includes a heating element 36 disposed outside of the heatable container 32. Although the heating element 36 is shown here disposed beneath the heatable container 32, it would be readily understood that the heating element 36 could be disposed on any side of the heatable container 32.

The heating element 36 in this embodiment is an electric heater that generates heat by electrical resistance. Alternatively, the heating element 36 may be a thermal lamp. The heating element 36 may also be a microwave generator for heating the liquid 33 in the heatable container 32. The heating element 36 may also be fire, powered by combustible fuel. For example, the heating element 36 may be a cooking stove.

A power supply 35 drives the heating element 36. In this embodiment, the power supply 35 is a battery, such as a car battery.

A controller 34 controls the supply of current to the heating element 36. The purpose of the heating element 36 is to heat the heatable container 32 to simulate the body temperature of a human or animal, which can be between 35.5 and 39 degrees Celsius for a human. Preferably, the heatable container 32 is maintained at about 37 degrees Celsius. Therefore, the controller 34, programmed with the size, weight, and material of the heatable container 32, is configured to limit current supply, or turn the heating element 36 off after a certain time, if it calculates that the heatable container's 32 temperature will exceed this threshold. In other words, the controller 32 may use a digital timer to determine whether to activate or deactivate the heating element 36.

The power supply 35 and the controller 34 are thermally insulated from the heating element 36 and the heatable container 32 by an insulating material.

Figure 5:
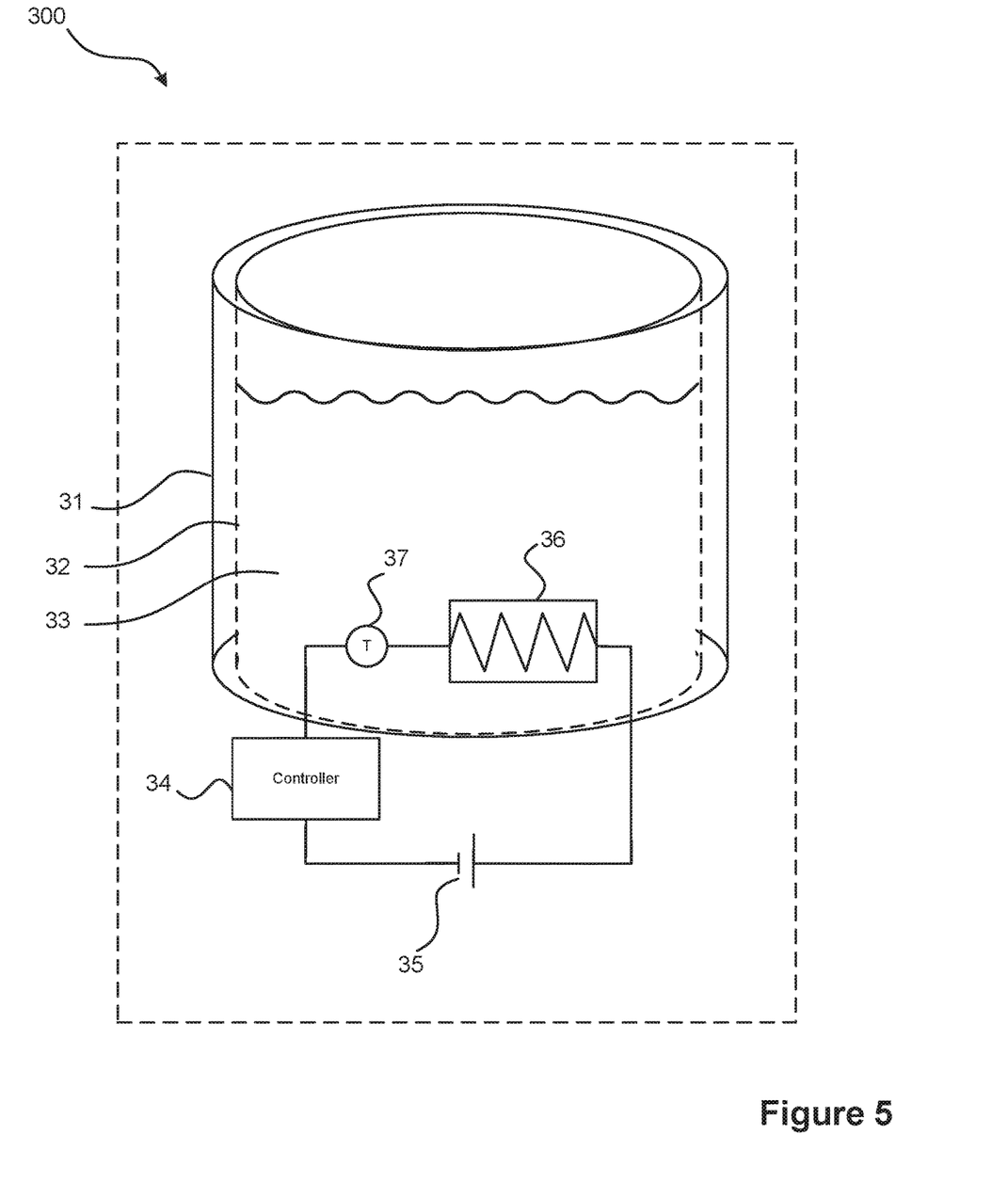
FIG. 5 shows another embodiment of the trapping unit of the present invention.

Referring now to FIG. 5, an alternative embodiment of trapping unit 300 of the apparatus 100 is shown. Here, the heating element 36 is disposed inside the heatable container 32, and the controller 34 and power supply 35 are disposed outside of the heatable container 32. The controller 34 and power supply 35 are thermally insulated from the heatable container 32. In this embodiment, the heating element 36 is an electrical resistor that generates heat when current flows through it.

The trapping unit 300 further comprises a temperature sensor 37 to sense the temperature of the liquid 33. The temperature information is fed into the controller 34, which controls the heating element 36 to heat the liquid 33 to the typical body temperature of a human or animal. When the temperature sensor 37 detects the temperature of the liquid 33 exceeds a threshold, such as the human body temperature of 37 degrees Celsius, the heating element 36 may be turned off until the temperature sensor 37 detects the temperature of the liquid 33 has fallen below another threshold.

Advantages of the insect trap 100 reside in the provision of the enclosure 10 in which the human or animal is received for generating odours, which are passed along the conduit 20 to the trapping unit 30 where mosquitoes are trapped and/or killed. These advantages include being able to utilise the scent of a live human or animal to attract insects, without exposing that human or animal to harm. Furthermore, the insect trap 100 provides a standardised method of collection that does not rely on human skill or alertness. Further advantages include being able to capture and/or kill large numbers of insects. More specific advantages include being able to kill large numbers of adult mosquitoes using outdoor equipment. Data from testing the basic prototype of the insect trap 100 in the field indicates that the insect trap 100 catches at least between 20% to 40% more mosquitoes than a Human Landing Catch. This is a vast improvement for monitoring mosquitoes attracted to bite humans and is a more standardised method that requires very little labour and does not expose people to mosquito bites.

The invention claimed is:

1. An insect trap comprising:
an enclosure for receiving a human or an animal therein, and comprising an opening configured to allow air to flow out of the enclosure and prevent insects from entering the enclosure, wherein the enclosure comprises a fan for blowing air through the opening towards the outside; and
a trapping unit disposed outside of the enclosure and in fluidic communication with the opening, and comprising a heatable container and a heating element, wherein the fan does not suck air into the trapping unit;
wherein the heatable container comprises either: (i) adhesive material, or (ii) material comprising insecticide, and is configured to hold a liquid for retaining heat energy, and wherein the heating element is configured to heat the heatable container and the liquid held therein.

2. The insect trap according to claim 1, wherein the liquid is water.

3. The insect trap according to claim 1, wherein the trapping unit further comprises:
a power supply for driving the heating element.

4. The insect trap according to claim 3, wherein the trapping unit comprises a controller for controlling the supply of power to the heating element.

5. The insect trap according to claim 4, wherein the trapping unit comprises a temperature sensor configured to sense the temperature of the liquid, and wherein the controller is configured to detect when the temperature of the liquid exceeds a threshold.

6. The insect trap according to claim 3, wherein the heating element is disposed inside the container.

7. The insect trap according to claim 1, wherein the liquid comprises chemicals that produce an exothermic reaction when mixed to heat the heatable container.

8. The insect trap according to claim 1, wherein the heating element is configured to heat the heatable container to a temperature of between 35 degrees Celsius and 40 degrees Celsius.

9. The insect trap according to claim 1, wherein the heatable container is heated to simulate a body temperature of about 37 degrees Celsius.

10. The insect trap according to claim 1, further comprising a conduit having two open ends, the first end being coupled to the opening and the second end being disposed at least adjacent to the trapping unit, wherein the conduit comprises a flexible material.

11. The insect trap according to claim 1, wherein the adhesive material or the material comprising insecticide cover side surfaces or the top of the heatable container.

12. The insect trap according to claim 1, wherein the enclosure is a tent.

13. The insect trap according to claim 1, wherein the insect trap is a mosquito trap.

14. The insect trap according to claim 1, wherein the adhesive material or the material comprising insecticide is disposed on the outside of the heatable container.

15. An insect trap comprising:
- an enclosure for receiving a human or an animal therein, and comprising an opening configured to allow air to flow out of the enclosure and prevent insects from entering the enclosure, wherein the enclosure comprises a fan for blowing air through the opening towards the outside; and
- a trapping unit disposed outside of the enclosure and in fluidic communication with the opening, and comprising a heatable container and a heating element;
- wherein the heatable container comprises either: (i) adhesive material, or (ii) material comprising insecticide, and the adhesive material or the material comprising insecticide is disposed on the outside of the heatable container, and the heatable container is configured to hold a liquid for retaining heat energy, and wherein the heating element is configured to heat the heatable container and the liquid held therein.

16. A method of trapping, killing, or trapping and killing an insect, the method comprising:
- disposing a human or animal inside an enclosure comprising an opening configured to allow air to flow out of the enclosure and prevent insects from entering the enclosure;
- blowing air through the opening to the outside using a fan;
- arranging a trapping unit outside of the enclosure to be in fluidic communication with the opening, wherein the fan does not suck air into the trapping unit and the trapping unit comprises:
  - a heatable container comprising either:
    - (i) adhesive material, or
    - (ii) material comprising insecticide,
- further comprising disposing a liquid in the heatable container for retaining heat energy,
- and heating the heatable container and the liquid using a heating element.

17. The method according to claim 16, wherein the liquid is water.

18. The method according to claim 16, comprising controlling the supply of power to the heating element.

19. The method according to claim 16, further comprising mixing chemicals to create an exothermic reaction to heat the heatable container.

* * * * *